United States Patent [19]
Fuchs

[11] 3,974,314
[45] Aug. 10, 1976

[54] ELECTRICAL INSULATION PARTICULARLY FOR USE IN WINDING SLOTS OF DYNAMO-ELECTRIC MACHINES AND METHOD FOR ITS MANUFACTURE

[75] Inventor: Heinz Fuchs, Embrach, Switzerland

[73] Assignee: Micafil A.G., Switzerland

[22] Filed: Mar. 20, 1974

[21] Appl. No.: 453,169

[30] Foreign Application Priority Data
Mar. 29, 1973 Switzerland.......................... 4568/73

[52] U.S. Cl................................. 428/212; 310/45; 310/215; 428/251; 428/285; 428/302; 428/317; 428/474
[51] Int. Cl.$^2$...................... H01B 17/60; H02K 3/36; B32B 5/02; B32B 5/14
[58] Field of Search .................... 161/79, 82, 92, 93, 161/161, 184, 185, 197, 227, DIG. 4; 174/110 N, 121 R, 121 SR, 138 E; 156/306, 309; 310/45, 215; 428/212, 236, 251, 268, 273, 282, 285, 286, 287, 74, 302, 317

[56] References Cited
UNITED STATES PATENTS

| | | | |
|---|---|---|---|
| 563,397 | 7/1896 | Jefferson............................. | 310/215 |
| 2,202,820 | 6/1940 | Baird et al. .......................... | 310/215 |
| 2,320,866 | 6/1943 | Hill .................................... | 310/215 |
| 2,417,746 | 3/1947 | Fletcher............................... | 310/215 |
| 2,924,264 | 2/1960 | Imhof.................................. | 161/184 |
| 3,427,394 | 2/1969 | McKean............................ | 174/121 R |
| 3,450,968 | 6/1969 | Cox.................................. | 174/110 PM |
| 3,735,169 | 5/1973 | Balke et al........................ | 310/215 |

OTHER PUBLICATIONS
Dupont, "Laminating, Fabricating, and Processing of Nomex High Temperature Resistant Nylon Paper," Bulletin N-204, Feb. 1967.

*Primary Examiner*—Marion E. McCamish
*Assistant Examiner*—Charles E. Lipsey

[57] ABSTRACT

A laminated molded insulation material for insulation of electrical machines and particularly useful for conductor slot insulation of dynamo-electric machines is produced by covering both sides of a dielectrically strong, homogeneous electrically insulating polyheterocylene foil such as polyhydantoin with protective layers of tangled fibers such as an aromatic polyamide paper known under the trade name "Nomex". The composite consisting of the protective tangled fiber layers joined to the insulating foil is then enclosed on both sides by layers of a high-tensile strength, fiber-reinforced synthetic resin using, for example, a glass fleece or glass-silk fabric as the fiber material, and which are joined to the protective tangled fiber layers and in such manner that within the protective layers opposite the insulating foil there exists a continuous remainder of non-resin impregnated tangled-fiber structure consisting solely of tangled fibers.

1 Claim, 2 Drawing Figures

ELECTRICAL INSULATION PARTICULARLY FOR USE IN WINDING SLOTS OF DYNAMO-ELECTRIC MACHINES AND METHOD FOR ITS MANUFACTURE

BACKGROUND OF THE INVENTION

1. Field of the Invention

This invention relates to an improved structure for a laminated molded insulation material for insulation of electrical apparatus and machines, and particularly for slot insulation of dynamo-electric machines, and wherein the laminations comprise fiber-reinforced carrier material, utilizing binding media, preferably as interlamination curable (or thermosetting) resins as the interlamination binding material, as well as to a novel method for making such insulation.

2. Description of the Prior Art

It is already known to use for rotor slot insulation of large dynamo-electrical machines primarily laminated glassfiber-reinforced resin ("GFK") molded articles, especially profiles, such as strips, L- and U-profiles, preferably made from hard glass fabrics. Insulations made from such laminated, molded materials are disadvantageous, on the one hand because of their relatively poor inter-laminar adhesion, which becomes apparent by its low resistance to gap formation, and, on the other hand because of their tendency to develop cracks when subjected to compression, bending or tensile stresses, depending on the angle of load, and not only surface cracks but primarily tension cracks such as matrix cracks and cracks along the boundary layer resin/glass, caused by local mechanical overstresses. These deficiencies weaken the electrical properties, especially the dielectric strength of the laminated, molded insulation material. There exists another disadvantage, namely, that the degree of safety preventing an electric breakdown will decrease sharply with a decrease in the number of layers when laminated, molded "GFK" materials are used. This is due to the fact that the probability of a lowering in electric strength of the compound material becomes greater when the number of layers is reduced and surface areas increase because of the many flaws that will occur within the individual layers, such as unfilled spots, pores, conducting inclusions of small-sized impurities and the like.

The stiff, laminated molded insulation is also subjected to unavoidable mechanical stresses during shipment, and also especially during installation, and it is thus not possible to avoid with complete safety formation of cracks caused by local overstresses. Furthermore, the slot insulation, for example, of the rotor component of the machine, is subjected to strong mechanical stresses during the operation of the machine because of the non-uniform heat expansion of components made of copper, insulation and iron and also due to the effects of centrifugal forces etc. In spite of careful electric pre-testing, the installed insulation will often fail the high-voltage test for the reasons mentioned above, requiring re-insulation which in most instances will be very costly.

It has already been proposed, to employ more flexible resin systems possessing greater rupturing elongation characteristics to overcome the disadvantageous susceptibility to cracking of the laminated, molded materials. However, this will lower unduly the thermal stability, thus losing the required rigidity of the laminated, molded material. In order to reduce the possibility of an electrical breakdown, profiles of laminated, molded material have been produced by employing a thermally stable insulating foil as an inner layer between plies of glass-fiber fabric. However, this structure for the laminated, molded material is also susceptible to losses in electric properties, similar to profiles made from resins that are 100% glass-fiber-reinforced because the cracks which form in the rigid resin/glass compound are very likely to extend into, and damage the insulating foil.

An attempt was also made to replace the insulating foil by a thicker layer of fleece made from organic or inorganic fibers. It was found that it was possible to reduce the formation of cracks by an appropriate increase in the thickness of the layer but at a cost of mechanical strength and rigidity because of insufficient glass-fiber content of the compounded material. In order to insure the required mechanical strength and rigidity, it becomes thus necessary to increase the thickness of the insulation still further, making the use of the winding slots inefficient and uneconomical. Finally, the attempt had been made to produce the laminated, molded materials from resin/fiber fleeces, including high-compressed material, but this attempt was unsuccessful in most cases because of the great drop in mechanical strength and the loss of rigidity.

SUMMARY OF THE INVENTION

It is the principal object of the invention to improve the structure of laminated, molded materials, especially concerning the effects of potential crack formations and other possible flaws, such as unfilled spots, for example pores, conductive enclosures of small-sized impurities and the like, which will lower the electric properties, especially the dielectric strength.

The invention which solves this specific problem is characterized by the novel structure of the laminated, molded material and in accordance with the following preferred processing steps for its manufacture:

a. a dielectrically strong, homogeneous, electrically insulating foil is covered on both sides with protective layers of tangled fibers, b. the protective layers of tangled fibers and the insulating foil are joined together, c. the insulating foil with its interconnected protective layers of tangled fibers is enclosed on both sides by layers of high-tensile strength fiber-reinforced binding medium for the strengthening of the outer layers, and d. the protective layers of tangled fibers and the fiber-reinforced outer layers are joined together, whereby within the protective layers of tangled fibers opposite the insulating foil there remains a continuous core portion of non-impregnated i.e. non-treated tangled-fiber structure, consisting solely of tangled fibers.

DESCRIPTION OF THE PREFERRED EMBODIMENTS

Figure 1:
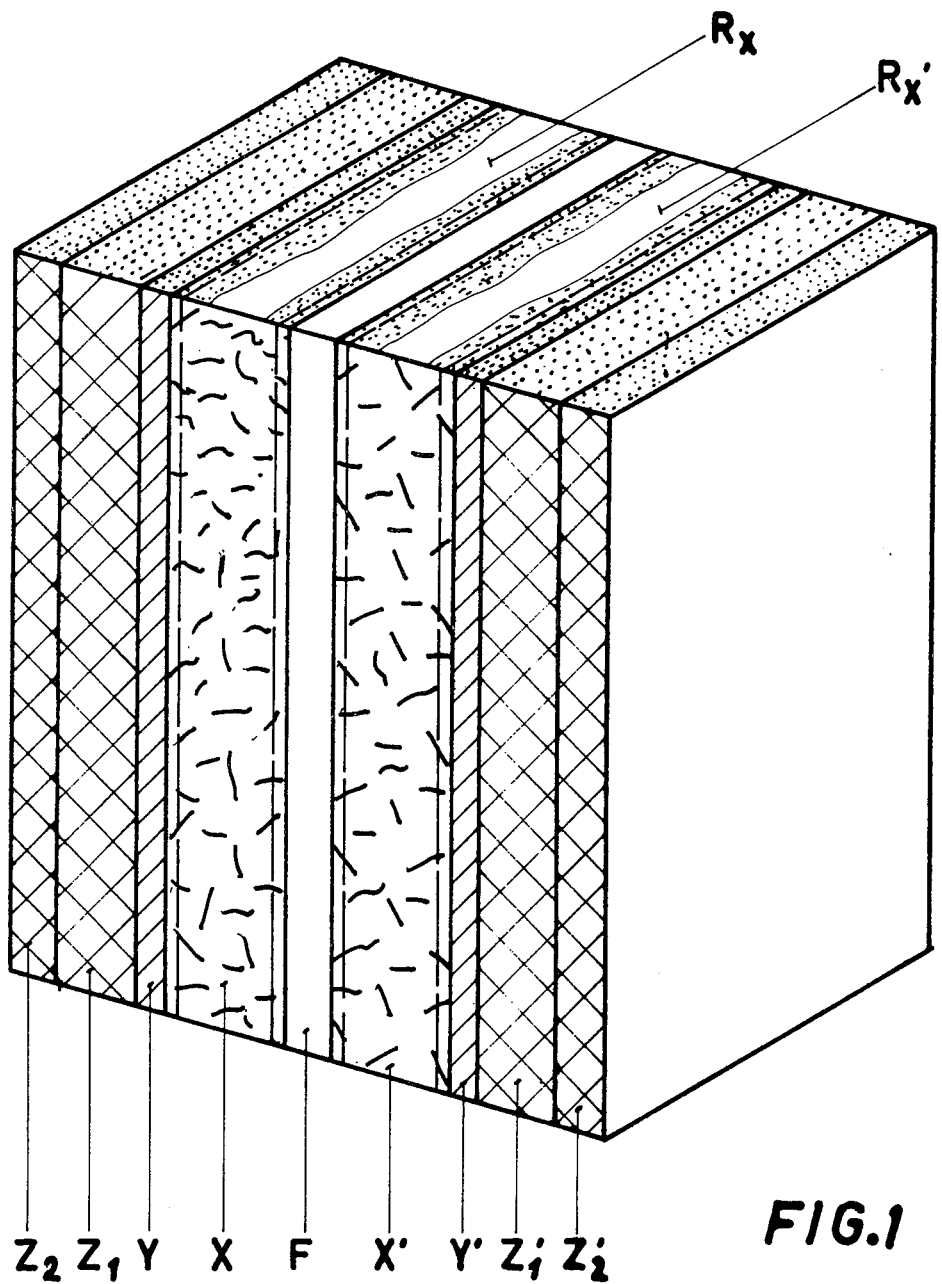

The process proposed by the invention is based on the feature that a dielectrically strong, thin and homogeneous electrically insulating foil, which standing alone will already ensure, to a large degree, the rigidity of the profile, is enclosed not only with fiber-reinforced outer layers, preferably consisting of hard glass fabrics, but is also covered on both sides directly by protective layers of tangled fibers. The protective layers of tangled fibers, consisting, for example, of fiber paper, fiber fleeces, fiber mats and the like, possess a fiber structure which is mechanicaly solid and uniform in all directions, particularly suitable for conductor slot insulations, and there are employed for this purpose preferably organic or inorganic fiber formations which are even more voluminous than oriented fiber structures such as fabrics. The compound rigidity of insulating foil and the protective layers of tangled fibers on the one hand, and of protective layers of tangled fibers and fiber-reinforced outer layers on the other hand should be approximately equal to, or greater than the inherent rigidity of the tangled fiber formations. When the mechanically rigid, profiled laminated molded materials are subjected to stresses, especially during the installation proper, for example, when used as slot insulation, the fiber-reinforced outer layers are placed under stresses which are compensated by a large extent within a relatively wide range by the remaining parts of the protective layers of tangled fibers which retain a non-impregnated fiber structure. This is accomplished by slight fiber displacements within the non-impregnated tangled fiber structure. In this manner it becomes possible to absorb substantially greater shearing stresses than in case of the known laminated molded materials such as hard glass fabrics which envelop the insulating foil directly on both sides, and to avoid, to a greater extent, the extension of cracks, which may form, at the centrally arranged, puncture-proof, homogeneous insulating foil. Thus, the dielectrically strong, homogeneous insulating foil will be protected effectively and within a wide range from mechanical damages, thereby increasing the electrical strength of the rigid, laminated molded material produced in accordance with the invention, a feature which will be reflected by a substantial increase in operational safety.

It will be advantageous if the surface of the protective layers of tangled fibers are impregnated with synthetic resin, either on one or both sides.

As a further development of the invention, synthetic resins and/or adhesives, such as glue-backed material, adhesive films or adhesive powders are utilized as binding media.

It will also be advantageous to impregnate the protective layers of tangled fibers with a liquid, preferably insulating oil.

It is also feasible to attain an adhesive connection, for example, by sintering and/or welding, between the insulating foil and the protective layers of tangled fibers on the one hand, and between the protective layers of tangled fibers and fiber-reinforced outer layers on the other hand.

It will also be expedient if the strength of compounding as between the electrically insulating foil and the protective layers of tangled fibers is lower than the inherent strength of the electrically insulating foil proper.

The layers of tangled fibers can be calendered and/or uncalendered. By proper selection of the fiber-reinforced outer layers, the protective layers of tangled fibers, the insulating foil and the binding agents utilized it becomes possible to produce laminated molded material of high rigidity with a grade of material corresponding to the heat classifications and possessing high-quality dielectric characteristics.

The fiber-reinforced resin outer layers can consist of glass fibers, glass fiber fleeces, glass mats or rovings or any other types of high-tensile fibers, although glass fabrics are preferred.

Tough inorganic or organic fiber formations, such as asbestos fibers, glass fibers or synthetic fibers —for example an aromatic polyamide known under the trade mark "Nomex" — are used preferably for the protective layers of tangled fibers, for example, for slot insulation.

The dielectrically strong, homogeneous, electrically insulating foils can consist of high temperature-resistant aromatic polyheterocyclenes, such as polyimide- and polyhydantoin- insulating foils, but polyester, polycarbonate and polysulphone insulating foils can also be used among others.

For the purpose of joining the insulating foils with the protective layers of tangled fibers, or the protective layers of tangled fibers with the fiber-reinforced outer layers respectively, heat-proof binding agents are employed, such as the matrix resins proper, or other fatigue-resistant adhesives. Phenol-, polyester-, epoxide-, polyimide- and similar resins can be used as the matrix.

A practical application of the process for the manufacture of a laminated, molded material as proposed by the invention can be accomplished advantageously by combining various systems. For example, the arrangement on both sides of the centrally placed insulating foil can be accomplished symmetrically, with the type of the formations, such as fleeces, mats, fabrics and the like, used for the appropriate protective and outer layers of the laminated molded material, as well as the number of layers and their thickness, being alike. A species of the laminated molded material, built-up symmetrically at both sides of the insulating foil, could be composed as follows:

$z$-layers of glass-silk fabric
$y$-layers of glass fleece
$x$-layers of aromatic polyamide paper "Nomex"
one centrally arranged polyhydantoin foil
$x$-layers of aromatic polyamide paper "Nomex"
$y$-layers of glass fleece
$z$-layers of glass-silk fabric.

Instead of a symmetrical construction it is also feasible to use an asymmetrical build-up, for example, by using different numbers of layers $x+a$, $y+b$ and $z+c$ on one side of the insulating foil. Also, the thickness, composition of materials, and type of the formations used for the individual layers, for example, of the outer layers, could be made dissimilar.

Practical examples of the laminated molded material proposed by the invention are shown in the drawing. There are shown in FIG. 1 — a species built-up symmetrically at both sides of the insulating foil, FIG. 2 — a species of an asymmetrical build-up.

EXAMPLE 1 (see FIG. 1):

| Layers | |
|---|---|
| | 2-layers glass-silk fabric pre-impregnated with epoxide synthetic resin (prepreg), impregnated through the fabric-thickness, |
| ($z_2$) | thickness = 0.1 mm |
| ($z_1$) | thickness = 0.2 mm |
| | 1-layer glass fleece, non treated |

-continued

| Layers | |
|---|---|
| (y) | thickness = 0.05 mm<br>1-layer of aromatic polyamide paper "NOMEX 410" pre-impregnated at both sides with epoxide synthetic resin (prepreg), calendered, impregnated only on the surface area |
| (x) | thickness = 0.3 mm<br>One centrally arranged polyhydantoin foil "Resistofol N" |
| (F) | thickness = 0.1 mm |
| (X') | 1-layer of aromatic polyamide paper "NOMEX 410" pre-impregnated at both sides with epoxide synthetic resin (prepreg), calendered, impregnated only on the surface area, thickness = 0.3 mm<br>1-layer glass fleece, non treated |
| (y') | thickness = 0.05 mm<br>2-layers glass-silk fabric pre-impregnated with epoxide synthetic resin (prepreg), impregnated through the fabric-thickness, |
| ($z_1'$) | thickness = 0.2 mm |
| ($z_2'$) | thickness = 0.1 mm |

Thickness total unpressed 1.4 mm $\doteq$ molded 1.1 ± 0.1 mm $R_x$ and $R_{x1}$ designate continuous remainder of non-impregnated tangled fiber structure.

Figure 2:
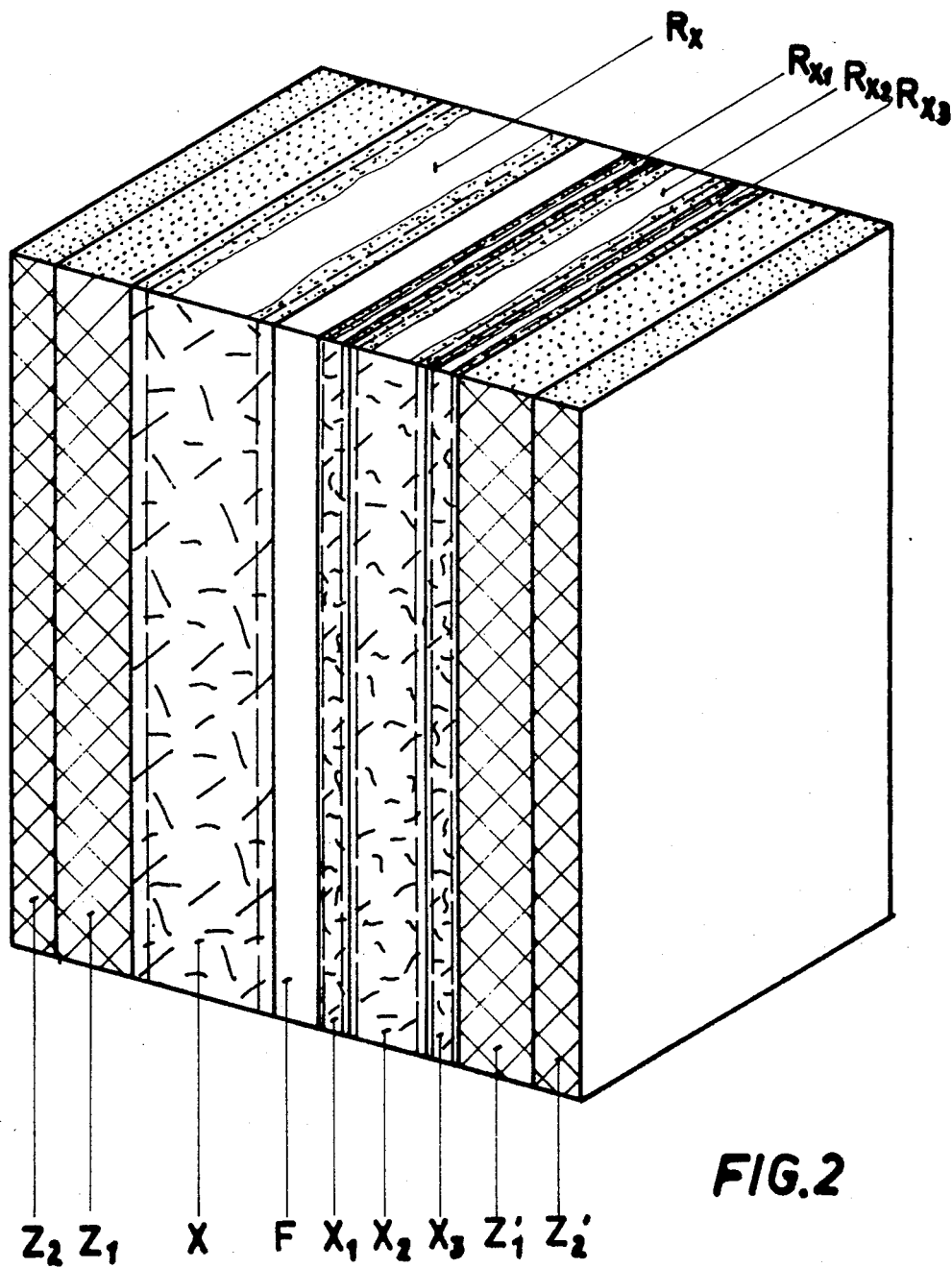

EXAMPLE 2 (see FIG. 2)

| Layers | |
|---|---|
| | 2-layers glass-silk fabric pre-impregnated with epoxide synthetic resin (prepreg), impregnated through the fabric-thickness |
| ($z_2$) | thickness = 0.1 mm |
| ($z_1$) | thickness = 0.2 mm |
| (y = 0) | |
| | 1-layer of aromatic polyamide paper "NOMEX 410" pre-impregnated at both sides with epoxide synthetic resin (prepreg), calendered, impregnated only on the surface area, |
| (x) | thickness = 0.3 mm |
| (F) | One polyhydantoin foil "Resistofol N" thickness = 0.1 mm |
| ($x_1$) | 1-layer of aromatic polyamide paper "NOMEX 410" pre-impregnated at both sides with epoxide synthetic resin (prepreg), calendered, thickness 0.08 mm, impregnated only on the surface area |
| ($x_2$) | 1-layer of aromatic polyamide paper "NOMEX 411" non treated<br>(non calendered), thickness = 0.15 mm |
| ($x_3$) | 1-layer of aromatic polyamide paper "NOMEX 410" pre-impregnated with epoxide synthetic resin at both sides (prepreg), calendered, impregnated only on the surface area, thickness = 0.08 mm |
| (y = 0) | |
| | 2-layers glass-silk fabric pre-impregnated with epoxide synthetic resin (prepreg), impregnated through the fabric-thickness |
| ($z_1''$) | thickness = 0.2 mm |
| ($z_2''$) | thickness = 0.1 mm |

Thickness total unpressed 1.31 mm $\doteq$ molded 1.0 ± 0.1 mm $R_x$, $R_{x1}$ $R_{x2}$ and $R_{x3}$ designate continuous remainder of non-impregnated tangled fiber structure.

The laminated insulation in accordance with the described structures given as examples can be produced, in accordance with the reaction behaviour of the particular binding media utilized, in the customary manner under heat and pressure in the compound state through curing, sintering and/or welding. In the case of use of the selected epoxide-synthetic resin-binding media, for example, by pressing for 1 hour at a temperature of 160°C and at a pressure level of 40 kp/cm².

The objective of the invention is not limited by, and to the examples given. It is possible, for example, to use, in place of a homogeneous insulating foil, one insulating layer which consists of two insulating foils connected with each other.

I claim:

1. A stiff multi-layer laminated molded structure for use as electrical insulation in electrical machines and particularly for use in slot insulation which comprises a continuous inner planar layer constituted by a dielectrically strong temperature stable homogeneous insulating synthetic resin foil, an intermediate tangled fiber planar layer coextensive with and adhered to each side of said insulating synthetic resin foil by means of a thermosetting synthetic resin binding agent and an outer thermosetting glass fiber reinforced synthetic resin planar layer coextensive with and adhered to each of said intermediate tangled fiber layers, said resin binding agents penetrating only the surface portions of each of said tangled fiber layers thereby leaving within each of the latter a core portion free from the binding agent for protecting said inner insulating synthetic resin foil against cracking due to imposed stresses.

* * * * *